Nov. 4, 1930.    P. P. HORNI    1,780,648
SELF STARTING SYNCHRONOUS MOTOR
Filed July 10, 1929
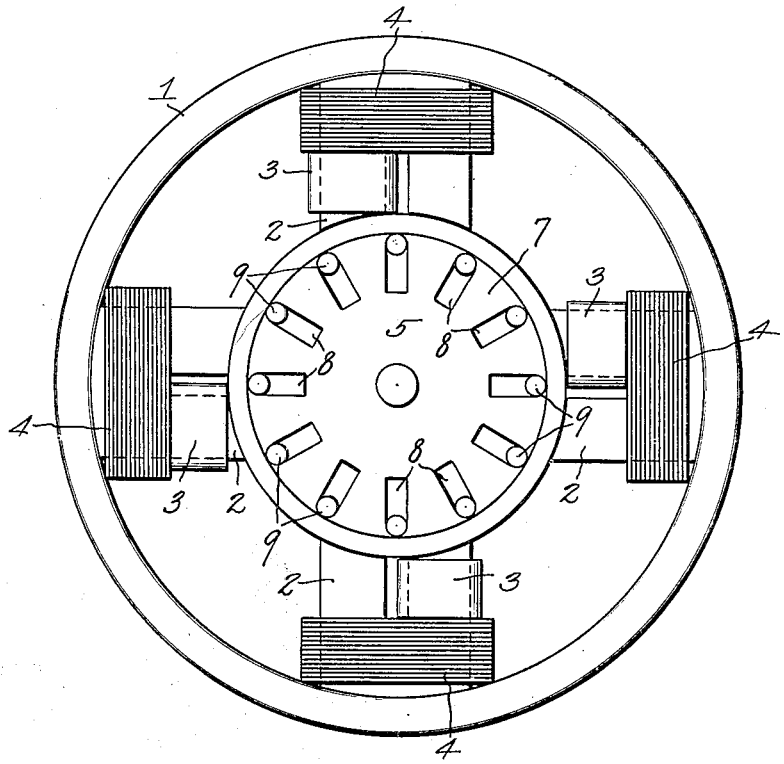
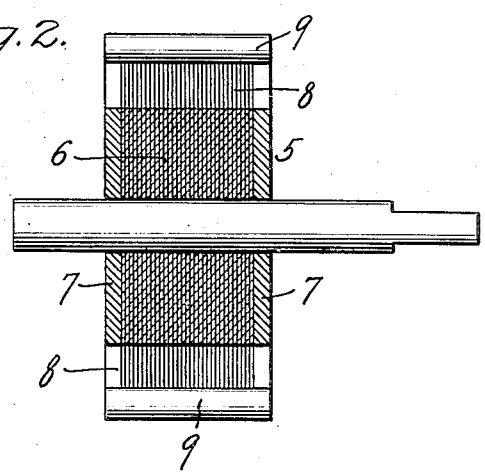
Inventor
PAUL P. HORNI Patented Nov. 4, 1930

1,780,648

UNITED STATES PATENT OFFICE

PAUL P. HORNI, OF NEWARK, NEW JERSEY

SELF-STARTING SYNCHRONOUS MOTOR

Application filed July 10, 1929. Serial No. 377,165.

The invention has for its object the production of a self-starting synchronous motor that will possess in a more marked degree reliability as to its self-starting, and also as to its synchronizing characteristics.

The invention also possesses the advantage over previous motors of this kind, that while retaining the extreme simplicity required for small motors of this character for operating signalling devices or the like, it will because of its peculiar construction possess very powerful torque characteristics.

In my improved motor I make use of a multipolar field which may for example have four poles, although a greater number of poles than four is also feasible. With such a multipolar field, I provide pole pieces that have split phase characteristics, as for example by having the pole pieces divided in two portions, one of which is shaded by a copper band to cause the magnetism flowing through that part of the pole to lag behind the magnetism flowing through the other part, and thus cause a rotating field of force in the well-known manner. With such a multipolar field, I make use of a rotor, which, according to the present invention, is made up of a laminated core having a number of radial slots cut into its periphery. In the outer ends of these slots, I place copper conductors, the ends of which connect electrically with copper end discs in a well-known squirrel cage manner. The feature to be observed is that the conductors occupy only the outer portions of the slots on the extreme periphery of the rotor and that the slots extend therefrom a material distance to the center of the rotor, leaving an air space. The object of this is to limit the inductive drag on the conductors and to accentuate the preferential magnetic diameters that give rise to the synchronizing tendency. By properly proportioning the size of the squirrel cage conductors, the depth of the slots and the number of teeth, I have been able to make a rotor that in a multipolar field will run in absolute synchronism at 600 revolutions on the ordinary 60 cycle A. C. circuit, and will do considerable work at such synchronous speed, while at the same time having sufficient inductive drag in its squirrel cage to make it absolutely unfailing in its self-starting feature, there being no possibility of the rotor ever locking, no matter how favorably the teeth may lay with respect to the poles of the field.

An embodiment of the invention is illustrated in the accompanying drawings in which Figure 1 is a side view of a multipolar field with my improved rotor.

Figure 2 is a longitudinal axial section through the rotor.

A filed may be made up of a rim 1 having split poles 2, four or more in number, one leg of each pole being shaded by a copper sleeve 3. Upon an alternative current being passed through the coil 4, a rotating magnetic field will be produced. In this field revolves a rotor 5, made up of solid iron or iron laminations flanked on each side with copper shrouds 7. Slots, preferably twelve in number, are shown at 8. These slots are cut sufficiently deep into the core of the rotor to enable the teeth between them to act as synchronous cogs which, when the rotor is spun up to a speed approximately 600 revolutions, will hold the rotor exactly at that speed, and withstand any tendency to either on the one hand slow down due to applied load, or speed up over the fixed speed of 600, which it might have a tendency to do by virtue of the drag of the rotating field on the squirrel cage cross conductors 9. These squirrel cage conductors 9 I have found must be placed at the outer periphery of the rotor in the extreme outer edges of the slots. In this way by making them of proper size, I am able to so control the inductive drag as to, while causing the rotor to start up with considerable force, allow the tooth formation to take absolute control of the speed when the proper speed has been attained.

It has been found by experiment that if the slots do not have the air spaces below the conductors, as for example, if the slots were made just deep enough to take the proper size conductors, satisfactory results in the matter of synchronization are not obtained. The rotor is liable to overrun the sub-cycle synchronous speed for which the rotor is designed. It has been found also that perfect results cannot be obtained even with a rotor of this kind with a two-pole field, there being in that case a tendency to lock and cause the motor to refuse to start. This is probably due to the difference between the path that the magnetic lines have through the rotor when a two-pole field is used, and the path that they take when a multiple field is employed.

I claim:—

1. A self-starting synchronous motor comprising, a multipolar field having rotating characteristics, a rotor turnable in said field, said rotor having an iron core with radial slots and longitudinal conductor rods in the outer portions of the slots, the remainder of said slots being free of conducting material.

2. A self-starting synchronous motor comprising, a multipolar rotating field magnet, a rotor turnable therein and having an iron core, with radial slots, conductors in the slots flush with the outer periphery of the core, the slots extending a material distance into the core inside of the conductors.

3. A self-starting synchronous motor comprising, a rotating field formed of at least four poles, a rotor turnable in said field, said rotor having an iron core with radial slots dividing the periphery of the core into teeth, conductor rods held between the outer edges of the teeth and flush with the outer periphery so as to leave space in the slots below the conductors.

4. A self-starting synchronous motor comprising, a rotating field having at least four shaded poles, a rotor turnable in said field, said rotor having an iron core and conducting end discs with radial slots dividing the periphery into teeth approximating the dimensions of one of the divisions of the polar projections of the field magnet with conductors in the outer portions only of the slots, with air spaces in the slots below the conductors, the said conductors being gaged to insure self-starting and the depth of slots being gaged to insure positive synchronism at speed.

PAUL P. HORNI.